US 9,727,482 B2

(12) United States Patent
Steely, Jr. et al.

(10) Patent No.: US 9,727,482 B2
(45) Date of Patent: *Aug. 8, 2017

(54) ADDRESS RANGE PRIORITY MECHANISM

(71) Applicant: Intel Corporation, Santa Clara, CA (US)

(72) Inventors: Simon Steely, Jr., Hudson, NH (US); Samantika S. Sury, Westford, MA (US); William C. Hasenplaugh, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/275,630

(22) Filed: Sep. 26, 2016

(65) Prior Publication Data

US 2017/0010974 A1    Jan. 12, 2017

Related U.S. Application Data

(63) Continuation of application No. 13/995,381, filed as application No. PCT/US2011/067209 on Dec. 23, 2011, now Pat. No. 9,477,610.

(51) Int. Cl.
*G06F 12/08* (2016.01)
*G06F 12/12* (2016.01)
(Continued)

(52) U.S. Cl.
CPC ...... *G06F 12/0891* (2013.01); *G06F 12/1009* (2013.01); *G06F 12/1054* (2013.01);
(Continued)

(58) Field of Classification Search
CPC .. G06F 12/126; G06F 12/127; G06F 12/0891; G06F 12/128; G06F 12/1054; G06F 12/1009; G06F 2212/683; G06F 2212/69; G06F 2212/621; G06F 2212/65; G06F 12/1027

See application file for complete search history.

(56) References Cited

U.S. PATENT DOCUMENTS 5,906,000 A    5/1999 Abe
6,349,365 B1   2/2002 McBride
(Continued)

FOREIGN PATENT DOCUMENTS

TW    201109924 A    3/2011

OTHER PUBLICATIONS

International Search Report and Written Opinion issued on Apr. 19, 2012, for counterpart International Application No. PCT/US2011/067209, 7 pages.

(Continued)

*Primary Examiner* — Rocio Del Mar Perez-Velez
(74) *Attorney, Agent, or Firm* — Trop, Pruner & Hu, P.C.

(57) ABSTRACT

Method and apparatus to efficiently manage data in caches. Data in caches may be managed based on priorities assigned to the data. Data may be requested by a process using a virtual address of the data. The requested data may be assigned a priority by a component in a computer system called an address range priority assigner (ARP). The ARP may assign a particular priority to the requested data if the virtual address of the requested data is within a particular range of virtual addresses. The particular priority assigned may be high priority and the particular range of virtual addresses may be smaller than a cache's capacity.

16 Claims, 7 Drawing Sheets

(51) Int. Cl.
*G06F 12/10* (2016.01)
*G06F 12/0891* (2016.01)
*G06F 12/126* (2016.01)
*G06F 12/1009* (2016.01)
*G06F 12/1045* (2016.01)
*G06F 12/128* (2016.01)
G06F 12/1027 (2016.01)

(52) U.S. Cl.
CPC .......... *G06F 12/126* (2013.01); *G06F 12/128* (2013.01); *G06F 12/1027* (2013.01); *G06F 2212/621* (2013.01); *G06F 2212/65* (2013.01); *G06F 2212/683* (2013.01); *G06F 2212/69* (2013.01)

(56) References Cited

U.S. PATENT DOCUMENTS

| | | |
|---|---|---|
| 7,278,008 B1 | 10/2007 | Case et al. |
| 2002/0065867 A1 | 5/2002 | Chauvel |
| 2005/0188158 A1 | 8/2005 | Schubert |
| 2009/0172315 A1 | 7/2009 | Iyer et al. |

OTHER PUBLICATIONS

Office Action with Taiwan IPO Search Report issued in TW Appln. No. 101149001, dated Oct. 22, 2014, 22 pages (with English translation).

ADDRESS RANGE PRIORITY MECHANISM

This application is a continuation of U.S. patent application Ser. No. 13/995,381, filed Jun. 18, 2013, which was the National Stage of International Application No. PCT/US2011/067209, filed Dec. 23, 2011, the content of which is hereby incorporated by reference.

FIELD OF THE INVENTION

The present disclosure pertains to the field of processors and, in particular, to optimizing cache management techniques.

DESCRIPTION OF RELATED ART

Advances in semi-conductor processing and logic design have permitted an increase in the amount of logic that may be present on integrated circuit devices. As a result, computer system configurations have evolved from a single or multiple integrated circuits in a system to multiple cores, multiple hardware threads, and multiple logical processors present on individual integrated circuits. A processor or integrated circuit typically comprises a single physical processor die, where the processor die may include any number of cores, hardware threads, or logical processors. The ever increasing number of processing elements—cores, hardware threads, and logical processors—on integrated circuits enables more tasks to be accomplished in parallel. However, the execution of more threads and tasks put an increased premium on shared resources, such as memory, and the management thereof.

Typically, cache memory includes a memory between a shared system memory and execution units of a processor to hold information in a closer proximity to the execution units. In addition, cache is typically smaller in size than a main system memory, which allows for the cache to be constructed from expensive, faster memory, such as Static Random Access Memory (SRAM). Both the proximity to the execution units and the speed allow for caches to provide faster access to data and instructions. Caches are often identified based on their proximity from execution units of a processor. For example, a first-level (L1) cache may be close to execution units residing on the same physical processor. Due to the proximity and placement, first level cache is often the smallest and quickest cache. A computer system may also hold higher-level or further out caches, such as a second level (L2) cache, which may also reside on the processor but be placed between the first level cache and main memory. And a third level (L3) cache may be placed on the processor or elsewhere in the computer system, such as at a controller hub, between the second level cache and main memory.

Caches provide significantly faster access to data and instructions than memory or hard disk. Consequently, it is desirable to store data that is frequently accessed in caches in order to minimize the number of times the system has access memory or hard disk. Thus, there is a need for ways to efficiently manage data within caches.

BRIEF DESCRIPTION OF THE DRAWINGS

Embodiments are illustrated by way of example and not limitation in the Figures of the accompanying drawings.

DETAILED DESCRIPTION

Figure 1:
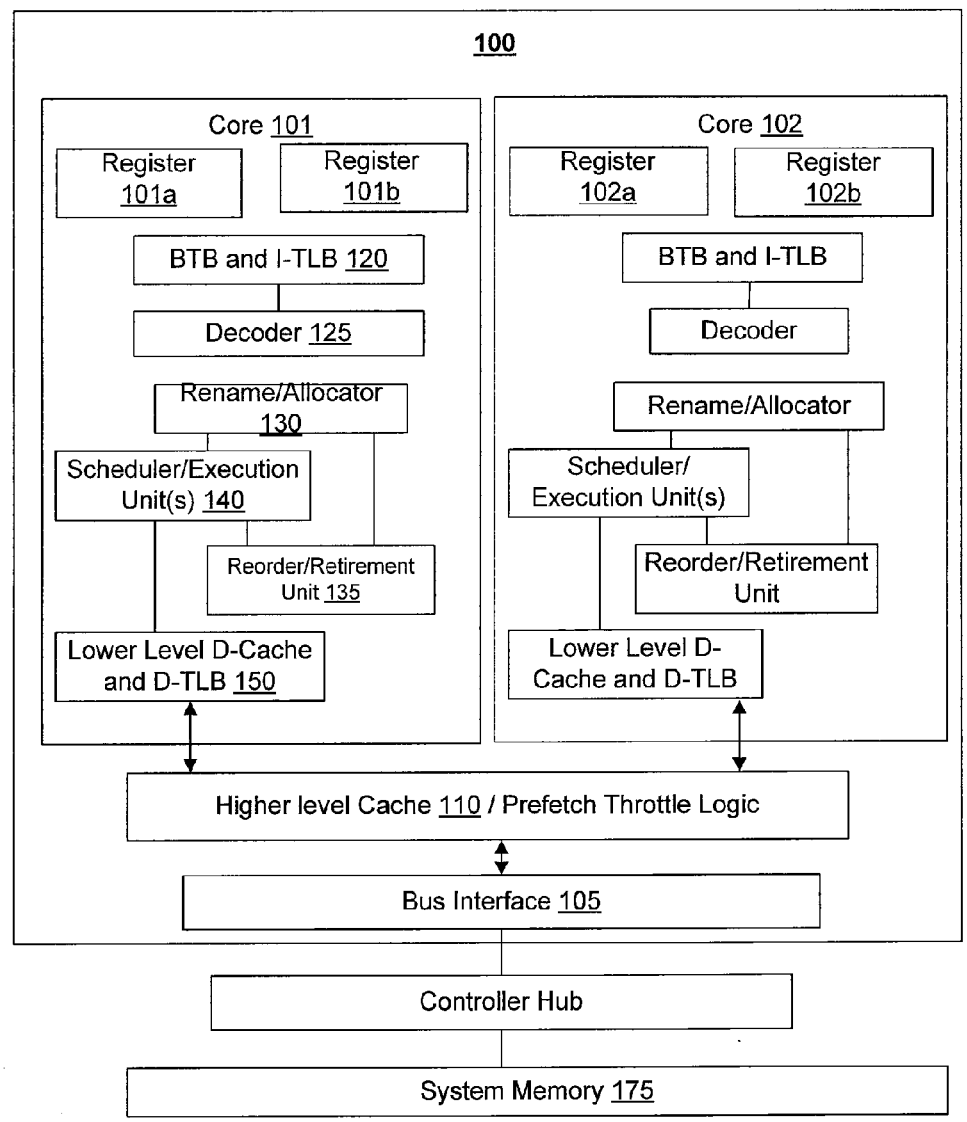
FIG. 1 illustrates an embodiment of a processor including multiple processing elements.

In the following description, numerous specific details are set forth such as examples of specific hardware structures for determining cache lines, reading/writing to cache lines, determining target caches, and determining cache line priorities, as well as placement of such hardware structures, such as at memory ports or at independent cache slices; specific processor units/logic, specific examples of processing elements, etc. in order to provide a thorough understanding of the present invention. It will be apparent, however, to one skilled in the art that these specific details need not be employed to practice the present invention. In other instances, well known components or methods, such as specific counter circuits, alternative multi-core and multi-threaded processor architectures, specific uncore logic, specific memory controller logic, specific cache implementations, specific cache coherency protocols, specific cache algorithms, and specific operational details of microprocessors, have not been described in detail in order to avoid unnecessarily obscuring the present invention.

Embodiments may be discussed herein which efficiently manage the data in caches. In particular, embodiments of the present invention pertain to a feature for managing data in caches based on priorities assigned to data. In an embodiment, data may be requested by a process using a virtual address of the data. The requested data may be assigned a priority by a component in a computer system, and the component may be called an address range priority assigner (ARP). In an embodiment, the component assigning the priority may be a translation look-aside buffer (TLB). In an embodiment, the component assigning priority assigns a particular priority to the requested data if the virtual address of the requested data is within a particular range of virtual addresses. In an embodiment, the particular priority assigned may be high priority and the particular range of virtual addresses may be smaller than a cache's capacity.

In an embodiment, the request may initially search a cache or multiple caches for the data, and if the data request encounters a cache miss, the request may retrieve the data from either memory or other computer storage such as a hard disk. The priority assigned to the request and/or retrieved data may be any priority, and the priorities of the data in the cache may be any priority. In an embodiment, the priority assigned to the request and/or retrieved data may be one of high priority and normal priority, and the priorities of the data in the cache may be one of high priority and normal priority. The data in a cache may be managed based on the priority assigned to the request and/or retrieved data, and the priorities of existing data in the cache. In an embodiment, data in a cache line in the cache may be replaced with the retrieved data if the cache line has data of normal priority and the retrieved data is high priority. In an embodiment, data in a cache line in the cache may be replaced with the retrieved data if the cache line has data of high priority and the retrieved data is high priority. In an embodiment, data in a cache line in the cache may be replaced with the retrieved data if the cache line has data of normal priority and the retrieved data is normal priority. The replacement of data in a cache may be performed based on a cache algorithm, including, Least Recently Used, Most Recently Used, Pseudo-Least Recently Used, Random Replacement, Segmented Least Recently Used, 2-Way Set Associative, Least Frequently Used, Adaptive Replacement Cache, Multi Queue Caching Algorithm and Re-Reference Interval Prediction. In an embodiment, the priority of data in each cache line may be represented by two bits, and the two bits may denote four possible values. The four possible values may indicate one of a first priority and a second priority.

Referring to FIG. 1, an embodiment of a processor including multiple cores is illustrated. Processor 100, in one embodiment, includes one or more caches. Processor 100 includes any processor, such as a micro-processor, an embedded processor, a digital signal processor (DSP), a network processor, or other device to execute code. Processor 100, as illustrated, includes a plurality of processing elements.

In one embodiment, a processing element refers to a thread unit, a thread slot, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Here, core hopping may be utilized to alleviate thermal conditions on one part of a processor. However, hopping from core 101 to 102 may potentially create the same thermal conditions on core 102 that existed on core 101, while incurring the cost of a core hop. Therefore, in one embodiment, processor 100 includes any number of cores that may utilize core hopping. Furthermore, power management hardware included in processor 100 may be capable of placing individual units and/or cores into low power states to save power. Here, in one embodiment, processor 100 provides hardware to assist in low power state selection for these individual units and/or cores.

Although processor 100 may include asymmetric cores, i.e. cores with different configurations, functional units, and/or logic, symmetric cores are illustrated. As a result, core 102, which is illustrated as identical to core 101, will not be discussed in detail to avoid repetitive discussion. In addition, core 101 includes two hardware threads 101a and 101b, while core 102 includes two hardware threads 102a and 102b. Therefore, software entities, such as an operating system, potentially view processor 100 as four separate processors, i.e. four logical processors or processing elements capable of executing four software threads concurrently.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, processor 100 includes a branch target buffer 120 to predict branches to be executed/taken and an instruction-translation buffer (I-TLB) 120 to store address translation entries for instructions.

Processor 100 further includes decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

As depicted, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded traces.

Note, in the depicted configuration that processor 100 also includes bus interface module 105 to communicate with devices external to processor 100, such as system memory 175, a chipset, a northbridge, or other integrated circuit. Memory 175 may be dedicated to processor 100 or shared with other devices in a system. Common examples of types of memory 175 include dynamic random access memory (DRAM), static RAM (SRAM), non-volatile memory (NV memory), and other known storage devices.

Figure 2:
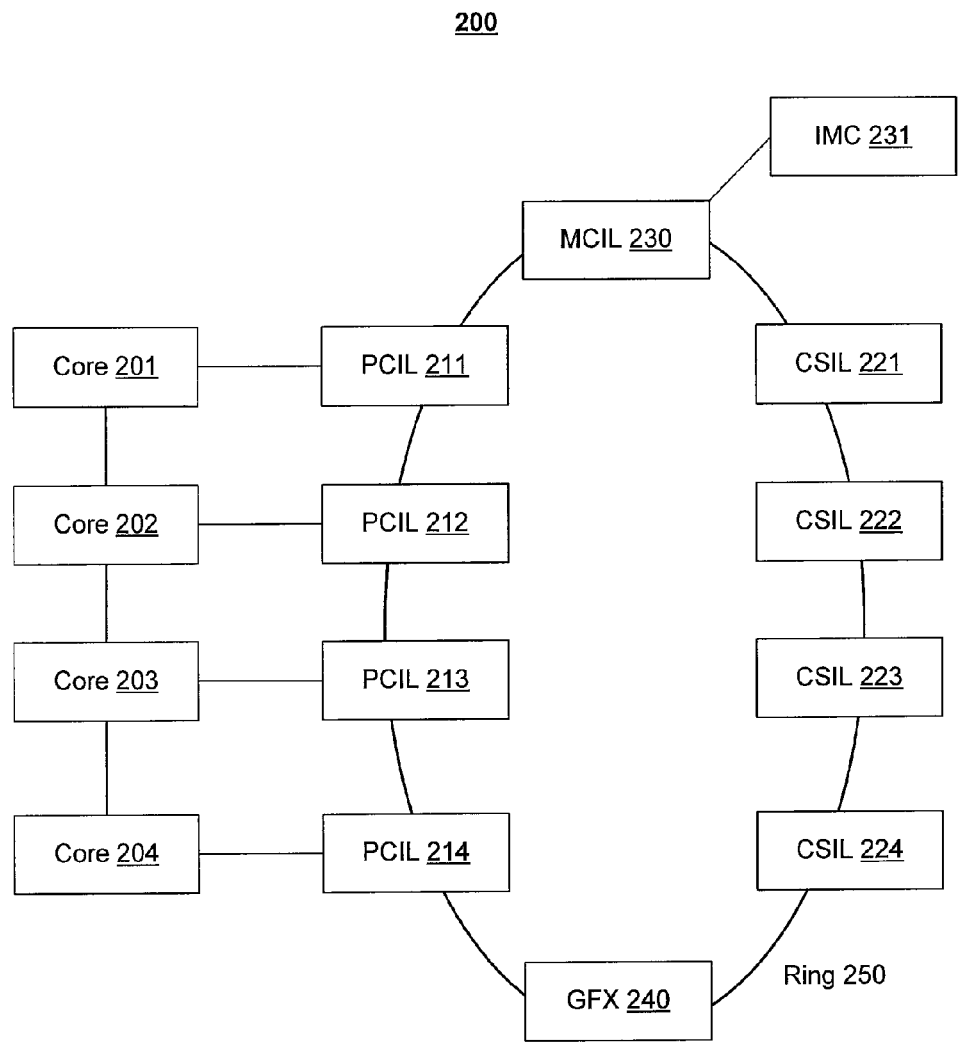
FIG. 2 illustrates an embodiment of on-core memory interface logic.

FIG. 1 illustrates an abstracted, logical view of an exemplary processor with a representation of different modules, units, and/or logic. However, note that a processor utilizing the methods and apparatus' described herein need not include the illustrated units. And, the processor may omit some or all of the units shown. To illustrate the potential for a different configuration, the discussion now turns to FIG. 2, which depicts an embodiment of processor 200 including an on-processor memory interface module—an uncore module—with a ring configuration to interconnect multiple cores. Processor 200 is illustrated including a physically distributed cache; a ring interconnect; as well as core, cache, and memory controller components. However, this depiction is purely illustrative, as a processor implementing the described methods and apparatus may include any processing elements, style or level of cache, and/or memory, front-side-bus or other interface to communicate with external devices.

In one embodiment, caching agents 221-224 are each to manage a slice of a physically distributed cache. As an example, each cache component, such as component 221, is to manage a slice of a cache for a co-located core—a core the cache agent is associated with for purpose of managing the distributed slice of the cache. As depicted, cache agents 221-224 are referred to as Cache Slice Interface Logic (CSIL)s; they may also be referred to as cache components, agents, or other known logic, units, or modules for interfacing with a cache or slice thereof. Note that the cache may be any level of cache; yet, for this exemplary embodiment, discussion focuses on a last-level cache (LLC) shared by cores 201-204.

Much like cache agents handle traffic on ring interconnect 250 and interface with cache slices, core agents/components 211-214 are to handle traffic and interface with cores 201-204, respectively. As depicted, core agents 221-224 are referred to as Processor Core Interface Logic (PCIL)s; they may also be referred to as core components, agents, or other known logic, units, or modules for interfacing with a processing element Additionally, ring 250 is shown as including Memory Controller Interface Logic (MCIL) 230 and Graphics Hub (GFX) 240 to interface with other modules, such as memory controller (IMC) 231 and a graphics processor (not illustrated). However, ring 250 may include or omit any of the aforementioned modules, as well as include other known processor modules that are not illustrated. Additionally, similar modules may be connected through other known interconnects, such as a point-to-point interconnect or a multi-drop interconnect.

It's important to note that the methods and apparatus' described herein may be implemented in any cache at any cache level, or at any processor or processor level. Furthermore, caches may be organized in any fashion, such as being a physically or logically, centralized or distributed cache. As a specific example, the cache may include a physical centralized cache with a similarly centralized tag directory, such as higher level cache 110. Alternatively, the tag directories may be either physically and/or logically distributed in a physically distributed cache, such as the cache organization illustrated in FIG. 2.

Figure 3:
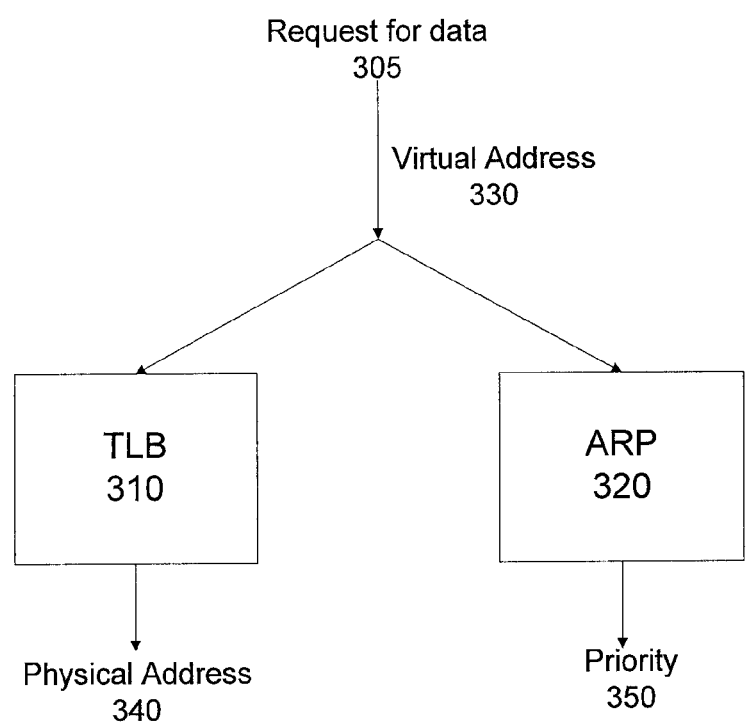
FIG. 3 illustrates a translation lookaside buffer (TLB) and an address range priority assigner (ARP) in an embodiment.

FIG. 3 illustrates a translation lookaside buffer (TLB) and an address range priority assigner (ARP) in an embodiment. A request for data 305 may contain a virtual address 330, which indicates the location in virtual memory where data is located. Virtual memory is a memory management technique which virtualizes multiple forms of computer data storage by presenting them to computer programs as a single form of memory (i.e., virtual memory), which behaves like directly addressable physical memory. In order to do this, a computer system may utilize a translation lookaside buffer (TLB) 310, which translates a virtual address to a physical address 340 pointing to the actual physical location of the data. Another computer component 320 may assign a priority 350 to the request 305. The computer component may be called the address range priority assigner (ARP) 320. The request for data 305 may first check if the data exists in caches in the system. If a cache miss occurs, i.e., the request does not find the data in the caches, the request may retrieve the data from a storage or memory device in the system by utilizing the physical address 340 obtained from the TLB 340.

Upon retrieving data from a storage or memory device, caches may be managed based on the priority 350 assigned to the request 305 by the ARP 320. A cache stores chunks of data called cache lines or cache blocks. The term cache line and cache block may be used interchangeably. A cache line may be composed of two main parts: metadata (or tag) and data. The tag entry identifies the contents of the corresponding data entry. A cache line may include status information, and status information may include a validity bit indicating whether the data in the cache line is valid. A cache line, and its underlying parts or fields such as the data field may be of any size. A cache line may include information which indicates the priority of the data in the cache line. The priority of the data may be stored as part of the cache line's tag.

Figure 4:
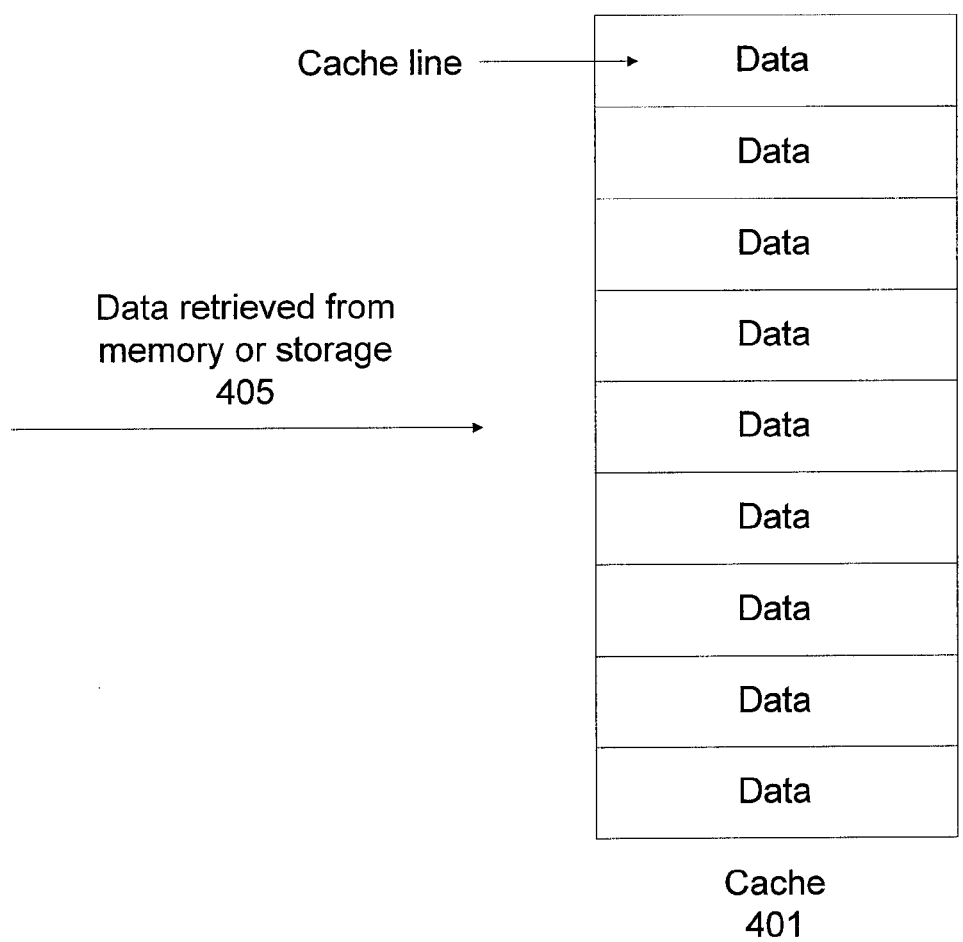
FIG. 4 illustrates cache management based on the priority assigned to a request by an ARP in an embodiment.

The number of possible priorities which may be assigned to the request 305 may be any number. In an embodiment, the number of possible priorities may be two. The two possible priorities may be high priority or normal priority. FIG. 4 illustrates cache management based on the priority assigned to a request by an ARP in an embodiment. A request may be assigned a priority by an ARP, and that request may retrieve data 405 from a storage or memory device after a cache miss. The system may determine whether the retrieved data 405 should be stored in a cache 401 based on the priority assigned to the retrieved data's (405) associated request. The cache 401 may be full, i.e., all the cache lines in the cache may contain valid data. Each cache line in cache 401 may include an indicator to indicate the priority of the data in the cache line. In an embodiment, the number of possible priorities which may be assigned to data in each cache line may be any number. In an embodiment, the number of possible priorities which may be assigned to data in each cache line belonging to cache 401 may be two. The two possible priorities may be high priority or normal priority.

In an embodiment, the priority assigned to the retrieved data's (405) associated request may be high priority. The retrieved data 405 may replace any cache line in the cache 401 which contains normal priority data using a suitable cache algorithm. The retrieved data 405 may not replace any cache line in the cache 401 which contains high priority data as long as there are cache lines with normal priority data present in cache 401. The retrieved data 405 may only replace a cache line in the cache 401 which contains high priority data if all the cache lines in cache 401 contain high priority data. If the retrieved data 405 replaces data from a cache line in cache 401, the retrieved data's associated priority and the retrieved data's other attributes may be written in the corresponding cache line.

In an embodiment, the priority assigned to the retrieved data's (405) associated request may be normal priority. The retrieved data 405 may replace any cache line in the cache 401 which contains normal priority data using a suitable cache algorithm. The retrieved data 405 may not replace any cache line in the cache 401 which contains high priority data. If the retrieved data 405 replaces data from a cache line in cache 401, the retrieved data's associated priority and the retrieved data's other attributes may be written in the corresponding cache line.

In the above embodiments, a suitable cache algorithm may include Least Recently Used (LRU), Most Recently Used (MRU), Pseudo-Least Recently Used, Random Replacement (RR), Segmented Least Recently Used, 2-Way Set Associative, Least Frequently Used (LFU), Adaptive Replacement Cache, Multi Queue Caching Algorithm and Re-Reference Interval Prediction (RRIP).

Figure 5:
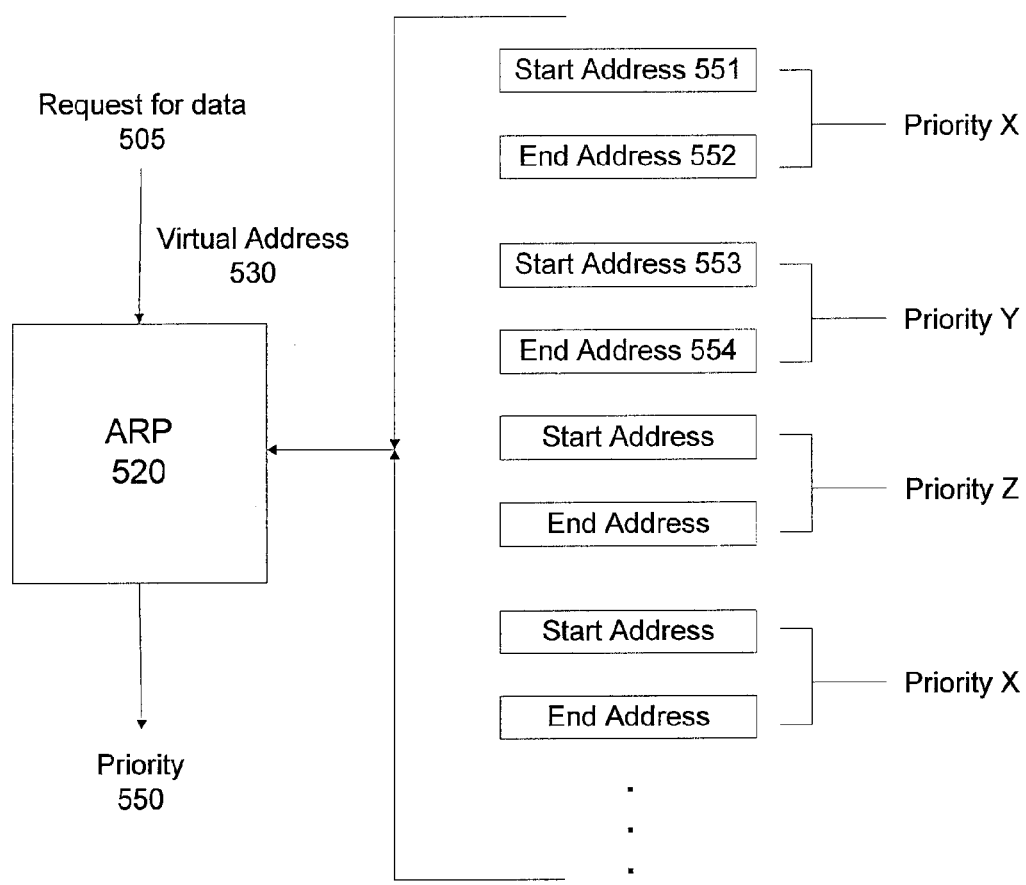
FIG. 5 illustrates an embodiment where an ARP determines how to assign a particular priority to an incoming request for data.

FIG. 5 illustrates an exemplary embodiment where an ARP determines how to assign a particular priority to an incoming request for data 505. The ARP 520 may determine the priority 550 of an incoming request for data 505 from a mapping which stores information about ranges of virtual addresses and corresponding priorities for those ranges. For example, in an embodiment, a mapping may indicate that any request for data containing a virtual address between the range of start address 551 and end address 552 is assigned a priority of X, any request for data containing a virtual address between the range of start address 553 and end address 554 is assigned a priority of Y, and so on. Multiple ranges may be defined for a single priority. In an embodiment, the start and end address for each range may be stored in a processor register. In an embodiment, the start and end addresses for each range may be stored in memory-mapped I/O space. Priorities X, Y, Z may indicate any priority including high priority, low priority, and normal priority. Any number of priorities may be defined in the mapping.

In an embodiment an ARP may be incorporated into a TLB, or a TLB may perform all the functions of an ARP.

In an embodiment, varying the ratio of different priority address ranges, may result is certain advantages. There are applications where specific software management of a cache store can improve the performance significantly compared to a fixed hardware allocation and replacement policies. An example is a scratchpad cache, where a program decides what is in the cache. However, building special purpose structures that are only available if a program utilizes them is not desirable. In an embodiment, if a defined high-priority address range is smaller than the cache capacity then the cache will treat that address range much like a scratchpad cache. Any reads or writes to data in that address range will stay in the cache. References to other addresses (not high-priority references) will only make use of the rest of the cache and not interfere with the high-priority scratchpad entries.

In an embodiment, the address range priority mechanism may be used for allocating cache space for applications accessing the contents of data structures at different rates. For example, in an embodiment, when a vector is multiplied by a matrix the elements in the matrix are only read once, but the elements in the vector are read multiple times. The size of the vector and the matrix may be very large compared to the cache size. If the address range spanned by the vector is assigned high-priority then a cache may only hold entries from the vector and maximize the utilization of the cache, since the matrix (only being accessed once) is not expected to realize cache hits, and not being high-priority, will ensure that the vector entries in the cache are not replaced by matrix entries.

In many computer calculations a matrix is formed where a substantial portion of the elements in the matrix are zero. If such a matrix is stored in a representation that only includes the non-zero elements, it is called a sparse-matrix. A sparse-matrix vector multiply occurs when multiplying such a non-zero element representation times a vector. In an embodiment, a sparse-matrix multiply may be performed by assigning the address ranged spanned by the vector a higher priority than the address range spanned by the sparse-matrix to maximize cache hits as explained above.

Figure 6:
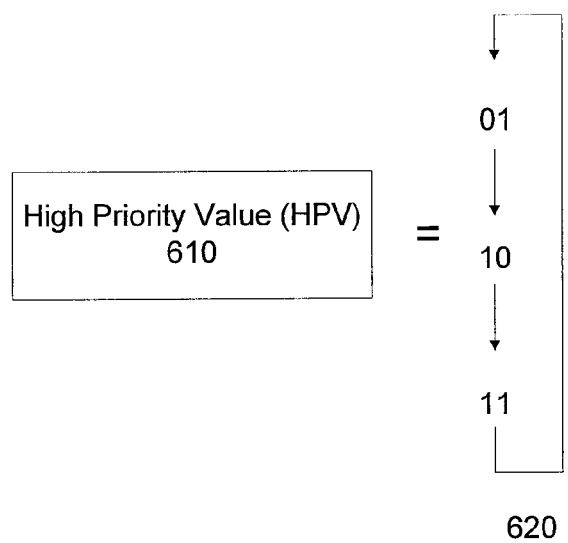
FIG. 6 illustrates, in an embodiment, resetting the priorities of data in a cache.

FIG. 6 illustrates, in an embodiment, resetting the priorities of data in a cache. In certain instances, the mapping which stores information about ranges of virtual addresses and corresponding priorities for those ranges may be reset. An example is when transition points occur during the execution of a program, or when a program loop or phase is over. In an embodiment, the bits denoting priorities of the data stored in associated caches may be cleared (i.e., reset to 0). In another embodiment, energy may be saved by implementing a High Priority Value (HPV) field. This field may be stored in a register, or in memory-mapped I/O space. A cache may hold data with two possible priorities: high priority and normal priority. Each cache line may store the priority information in its corresponding cache tag. The priority information may be represented by two bits, with four possible values: 00, 01, 10, and 11. The value 00 may always indicate a normal priority entry. In other words, if the priority information of a cache line is represented by 00, then that cache line's data is deemed normal priority data. At any given time, only one of the other three possible values indicates high priority. The two remaining values may indicate normal priority. The HPV always holds the value which indicates high priority. For example, if an HPV 610 holds a value of 01, then any data in a corresponding cache with an associated priority indicator value of 01 is treated as high priority data. Similarly, an ARP will assign a value of 01 to any request which is deemed high priority. At the point when the mapping which stores information about ranges of virtual addresses and corresponding priorities for those ranges needs to be reset, the value in the HPV 610 is may be cycled 620 to the next value, i.e., 10. Therefore, any data in a corresponding cache with an associated priority indicator value of 01 (the previous high priority indicator, but currently a low priority indicator) is now treated as low priority data, effectively resetting the priorities of the data in the cache. The HPV 610 may be set to the next value in the cycle each time the mapping is reset.

Although FIG. 6 was explained with reference to high priority and normal priority data, in other embodiments, any number of priorities may be reset using an HPV or multiple HPVs. There may be other fields which hold the current values of other priorities, for example, there may be one or more Normal Priority Value (NPV) registers, or one or more Low Priority Value (LPV) registers, or registers for any other priority values. In addition, the registers are not necessarily restricted by 3 possible values (i.e., 01, 10, or 11). Any other values and any number of possible values may be used.

In an embodiment, an address priority mechanism may provide anti-priority or no-cache priority. A no-cache priority may be assigned to a memory address range and those lines will not be allocated into a corresponding cache level. For example, for memory regions which are streamed through it may be best to not cache them at all. In an embodiment, a mechanism may mark the end of use of a high-priority line and free it up to be replaced even though the address range encompassing that line may still be marked as high-priority. In an embodiment, replacement schemes could age priorities and lower the priority of a line which hasn't been touched in a while.

In an embodiment, an instruction executed by a computer could assign the priority to be used if a cache miss occurs. In another embodiment, if the address of an executed instruction is in a particular range then any cache miss caused by such an instruction is assigned a particular priority.

Figure 7:
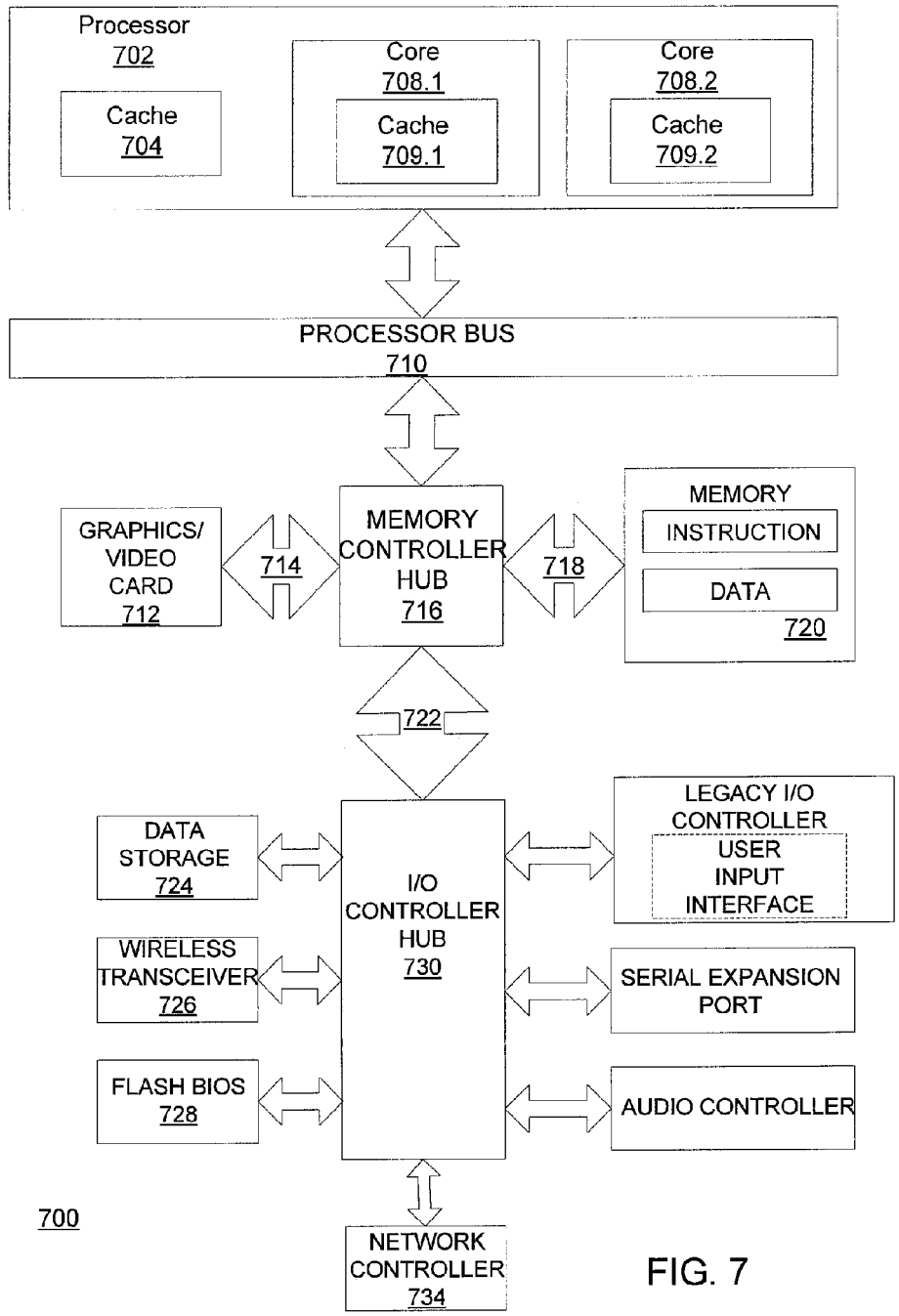
FIG. 7 is a block diagram of an exemplary computer system in an embodiment.

FIG. 7 is a block diagram of an exemplary computer system 700 formed with a processor 702 that includes one or more cores 708 (e.g., cores 708.1 and 708.2). Each core 708 may execute an instruction in accordance with one embodiment of the present invention. System 700 includes a component, such as a processor 702 to employ execution units including logic to perform algorithms for process data, in accordance with the present invention. System 700 is representative of processing and/or StrongARM™ microprocessors available from Intel Corporation of Santa Clara, Calif., although other systems (including PCs having other microprocessors, engineering workstations, set-top boxes and the like) may also be used. In one embodiment, sample system 700 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

One embodiment of the system 700 may be described in the context of a single processor desktop or server system, but alternative embodiments can be included in a multiprocessor system. System 700 may be an example of a 'hub' system architecture. The computer system 700 includes a processor 702 to process data signals. The processor 702 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 702 is coupled to a processor bus 710 that can transmit data signals between the processor 702 and other components in the system 700. The elements of system 700 perform their conventional functions that are well known to those familiar with the art.

Depending on the architecture, the processor 702 can have a single internal cache or multiple levels of internal cache. Alternatively, in another embodiment, the cache memory can reside external to the processor 702. Other embodiments can also include a combination of both internal and external caches depending on the particular implementation and needs. In one embodiment, the processor 702 may include a Level 2 (L2) internal cache memory 704 and each core (e.g., 708.1 and 708.2) may include a Level 1 (L1) cache (e.g., 709.1 and 709.2, respectively). In one embodiment, the processor 702 may be implemented in one or more semiconductor chips. When implemented in one chip, all or some of the processor 702's components may be integrated in one semiconductor die.

Each of the core 708.1 and 708.2 may also include respective register files (not shown) that can store different types of data in various registers including integer registers, floating point registers, status registers, and instruction pointer register. Each core 708 may further include logic to perform integer and floating point operations.

The processor 702 also includes a microcode (ucode) ROM that stores microcode for certain macroinstructions. For one embodiment, each core 708 may include logic to handle a packed instruction set (not shown). By including the packed instruction set in the instruction set of a general-purpose processor 702, along with associated circuitry to execute the instructions, the operations used by many multimedia applications may be performed using packed data in a general-purpose processor 702. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of the processor 702 can also be used in micro controllers, embedded processors, graphics devices, DSPs, and other types of logic circuits. System 700 includes a memory 720. Memory 720 can be a dynamic random access memory (DRAM) device, a static random access memory (SRAM) device, flash memory device, or other memory device. Memory 720 can store instructions and/or data represented by data signals that can be executed by the processor 702.

A system logic chip 716 is coupled to the processor bus 710 and memory 720. The system logic chip 716 in the illustrated embodiment is a memory controller hub (MCH).

The processor 702 can communicate to the MCH 716 via a processor bus 710. The MCH 716 provides a high bandwidth memory path 718 to memory 720 for instruction and data storage and for storage of graphics commands, data and textures. The MCH 716 is to direct data signals between the processor 702, memory 720, and other components in the system 700 and to bridge the data signals between processor bus 710, memory 720, and system I/O 722. In some embodiments, the system logic chip 716 can provide a graphics port for coupling to a graphics controller 712. The MCH 716 is coupled to memory 720 through a memory interface 718. The graphics card 712 may be coupled to the MCH 716 through an Accelerated Graphics Port (AGP) interconnect 714.

System 700 uses a proprietary hub interface bus 722 to couple the MCH 716 to the I/O controller hub (ICH) 730. The ICH 730 provides direct connections to some I/O devices via a local I/O bus. The local I/O bus is a high-speed I/O bus for connecting peripherals to the memory 720, chipset, and processor 702. Some examples are the audio controller, firmware hub (flash BIOS) 728, wireless transceiver 726, data storage 724, legacy I/O controller containing user input and keyboard interfaces, a serial expansion port such as Universal Serial Bus (USB), and a network controller 734. The data storage device 724 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Many of the embodiments above have been explained in the context of fully associative caches, i.e., caches where data can be stored in any cache location. However, a person of ordinary skill in the art will appreciate that the above embodiments may be implemented in any type of cache, including, set-associative caches. A set-associative cache is a hybrid between a fully associative cache and a direct mapped cache where each address is mapped to a certain set of cache locations. The mechanisms discussed above may be used to assign priorities and operate on cache lines in a particular set or sets within set-associative caches.

Although the above embodiments have been discussed with regards to cache memory and ranges of addresses, other embodiments may be built with tables of addresses, or IP addresses, or any other information that could be used to mark which access should be assigned a priority. Embodiments can also support multiple priorities and have different address ranges with different relative priorities.

A value, as used herein, includes any known representation of a number, a state, a logical state, or a binary logical state. Often, the use of logic levels, logic values, or logical values is also referred to as 1s and 0s, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   at least one core to execute one or more threads, the at least one core including:
   a plurality of execution units;
   one or more register files;
   a translation lookaside buffer to translate a virtual address of a request for first data to a physical address, the first data associated with a first thread;
   a priority assigner to assign a first priority to the first data;

a first cache memory to store data, the first cache memory including a plurality of cache lines to store a priority value and a corresponding data;

a priority value storage to store a given priority value of a plurality of priority values to indicate that the given priority value stored in the cache lines of the first cache memory having the given priority value is to be treated as high priority and that the priority value stored in the cache lines of the first cache memory having others of the plurality of priority values is not to be treated as high priority; and wherein the first cache memory is to evict second data stored in a first cache line of the first cache memory and store the first data in the first cache line, wherein the first data has the same priority as the second data, and wherein the first cache memory is to prevent third data having a second priority from being allocated into the first cache memory; and a second cache memory coupled to the at least one core.

2. The processor of claim 1, wherein the first cache memory is to clear the first priority of the first data at an end of a program phase.

3. The processor of claim 1, wherein the first cache memory comprises a lower level cache memory.

4. The processor of claim 3, wherein the second cache memory comprises a higher level cache memory.

5. The processor of claim 1, wherein the first cache memory is to store fourth data having the second priority in a second cache line of the first cache memory.

6. The processor of claim 1, wherein the priority assigner is to assign the first priority to the first data based at least in part on an address range in which the virtual address is included.

7. The processor of claim 1, wherein the processor is to mark an end of use of the first cache line.

8. The processor of claim 1, wherein the priority value storage comprises a register to identify which of the plurality of priority values are to indicate the high priority.

9. The processor of claim 1, wherein the processor is to update the given priority value stored in the priority value storage to effect a change to priorities of existing data in the cache lines of the first cache memory without update to priority fields of the cache lines of the first cache memory, responsive to a program transition.

10. The processor of claim 1, wherein the priority assigner is to indicate that data stored in a particular address range is not to be cached.

11. A non-transitory machine-readable medium having stored thereon instructions, which if performed by a machine cause the machine to perform a method comprising:

associating an address range spanned by a vector with a first priority and associating an address range spanned by a matrix with a second priority;

generating, in a translation lookaside buffer (TLB) of a processor, a physical address of data of the vector responsive to receipt of a request for the data having a virtual address, the data associated with a first thread;

assigning, in a priority assigner, the first priority to the data, responsive to the receipt of the request for the data having the virtual address; and evicting second data stored in a first cache line of a first cache memory and storing the data in the first cache line, wherein the data and the second data have the first priority and wherein the first cache memory is to prevent third data of the matrix and having the second priority from being allocated into the first cache memory, the first priority higher than the second priority.

12. The non-transitory machine-medium of claim 11, wherein the method further comprises accessing a mapping that stores information about ranges of virtual addresses and corresponding priorities for the ranges, wherein the mapping is to be reset responsive to a transition point of a program.

13. A system comprising:
a processor comprising:
a decoder to decode instructions;
a scheduler to schedule instructions for execution;
a plurality of execution units to execute instructions;
a translation lookaside buffer to translate a virtual address associated with a request for first data to a physical address, the first data associated with a first thread;
a priority assigner to assign a first priority to the first data;
a first cache memory to store data, the first cache memory including a plurality of cache lines to store a priority value and corresponding data;
a priority value storage to store a given priority value of a plurality of priority values to indicate that the given priority value stored in the cache lines of the first cache memory having the given priority value is to be treated as high priority and that the priority value stored in the cache lines of the first cache memory having others of the plurality of priority values is not to be treated as high priority, wherein the processor is to update the given priority value stored in the priority value storage to effect a change to priorities of existing data in the cache lines of the first cache memory without update to priority fields of the cache lines of the first cache memory;
wherein the first cache memory is to evict second data stored in a first cache line of the first cache memory and store the first data in the first cache line, wherein the first data has the same priority as the second data, and wherein the first cache memory is to prevent third data having a second priority from being allocated into the first cache memory; and
a second cache memory coupled to the first cache memory; and
a dynamic random access memory coupled to the processor.

14. The system of claim 13, wherein the first cache memory is to clear the first priority of the first data at an end of a program phase.

15. The system of claim 13, wherein the processor is to mark an end of use of the first cache line.

16. The system of claim 13, wherein the priority assigner is to assign the second priority to prevent the third data from being allocated into the first cache memory.

* * * * *